(12) United States Patent
Xue et al.

(10) Patent No.: US 11,271,703 B2
(45) Date of Patent: Mar. 8, 2022

(54) TECHNIQUES FOR IMPROVING CONTROL CHANNEL CAPACITY

(71) Applicant: QUALCOMM Incorporated, San Diego, CA (US)

(72) Inventors: Feng Xue, Redwood City, CA (US); Tao Luo, San Diego, CA (US); Yongbin Wei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/700,965

(22) Filed: Apr. 30, 2015

(65) Prior Publication Data
US 2015/0319021 A1 Nov. 5, 2015

Related U.S. Application Data

(60) Provisional application No. 61/987,867, filed on May 2, 2014.

(51) Int. Cl.
*H04L 5/00* (2006.01)
*H04L 27/00* (2006.01)
(Continued)

(52) U.S. Cl.
CPC ............ *H04L 5/006* (2013.01); *H04L 5/0053* (2013.01); *H04L 27/0012* (2013.01);
(Continued)

(58) Field of Classification Search
CPC . H04L 27/0012; H04L 27/3483; H04L 5/006; H04L 5/0053; H04W 72/042; H04W 24/08
(Continued)

(56) References Cited

U.S. PATENT DOCUMENTS 8,155,648 B2 * 4/2012 Lee .................. H04W 4/60
                                                          455/434
8,380,212 B2 * 2/2013 Sohn, III ............ H04W 72/085
                                                          455/450
(Continued)

FOREIGN PATENT DOCUMENTS

CN      101018105 A      8/2007
CN      101627583 A      1/2010
(Continued)

OTHER PUBLICATIONS

Partial International Search Report—PCT/US2015/028931—ISA/EPO—Jul. 31, 2015. (11 total pages).
(Continued)

*Primary Examiner* — Raymond S Dean
(74) *Attorney, Agent, or Firm* — Qualcomm Incorporated

(57) ABSTRACT

Aspects described herein relate to modulating control data in wireless communications. First control data for a first device can be modulated in an enhancement layer of a control data resource based at least in part on whether the control data resource includes second control data for a second device, and transmitted over the control data resource. A signal can be received from an access point comprising at least one control data resource. One of a plurality of modulation schemes utilized to modulate the at least one control data resource and an associated layer can be determined. The signal can be demodulated according to the one of the plurality of modulation schemes and the layer to obtain control data in the at least one control data resource.

25 Claims, 9 Drawing Sheets

(51) Int. Cl.
*H04W 72/04* (2009.01)
*H04W 24/08* (2009.01)
*H04L 27/34* (2006.01)

(52) U.S. Cl.
CPC ......... *H04L 27/3483* (2013.01); *H04W 24/08* (2013.01); *H04W 72/042* (2013.01)

(58) Field of Classification Search
USPC .......................................................... 455/511
See application file for complete search history.

(56) References Cited

U.S. PATENT DOCUMENTS

| | | | | |
|---|---|---|---|---|
| 9,084,274 | B2* | 7/2015 | Lee | H04W 72/10 |
| 9,622,228 | B2 | 4/2017 | Malladi et al. | |
| 9,942,013 | B2 | 4/2018 | Malladi et al. | |
| 2006/0198454 | A1* | 9/2006 | Chung | H04L 25/0202 375/260 |
| 2007/0268977 | A1* | 11/2007 | Wang | H04L 5/0007 375/261 |
| 2007/0270170 | A1 | 11/2007 | Yoon et al. | |
| 2008/0049692 | A1 | 2/2008 | Bachu et al. | |
| 2008/0304558 | A1* | 12/2008 | Zhu | H04L 25/03146 375/233 |
| 2009/0279418 | A1* | 11/2009 | Scarpa | H04L 27/2053 370/206 |
| 2010/0091892 | A1* | 4/2010 | Gorokhov | H04L 1/0026 375/260 |
| 2011/0255582 | A1* | 10/2011 | Prasad | H04L 25/03331 375/224 |
| 2012/0063351 | A1* | 3/2012 | Kim | H04L 5/001 370/252 |
| 2014/0050191 | A1* | 2/2014 | Kim | H04L 5/001 370/329 |
| 2014/0105164 | A1 | 4/2014 | Moulsley et al. | |
| 2014/0161092 | A1* | 6/2014 | Seo | H04L 5/0053 370/329 |
| 2015/0270931 | A1* | 9/2015 | Sun | H04L 1/0072 370/329 |

FOREIGN PATENT DOCUMENTS

| | | | |
|---|---|---|---|
| CN | 102439866 | A | 5/2012 |
| CN | 102883164 | A * | 1/2013 |
| EP | 1 531 560 | A1 | 5/2005 |
| EP | 2 326 053 | A1 | 5/2011 |
| JP | 2003525537 | A | 8/2003 |
| JP | 2004040661 | A | 2/2004 |
| JP | 2009545193 | A | 12/2009 |
| JP | 2013507800 | A | 3/2013 |
| JP | 2013519322 | A | 5/2013 |
| JP | 2013239777 | A | 11/2013 |
| KR | 20080109812 | A | 12/2008 |
| WO | 2007133051 | A2 | 11/2007 |
| WO | WO-2010029643 | A1 | 3/2010 |
| WO | 2010129605 | A1 | 11/2010 |
| WO | WO-2011/026235 | A1 | 3/2011 |
| WO | 2013027926 | A1 | 2/2013 |
| WO | WO-2015171422 | A1 | 11/2015 |

OTHER PUBLICATIONS

Partial European Search Report—EP20210431—Search Authority—Munich—dated Feb. 9, 2021.
Fujitsu: "Hierarchical Modulation based DL MIMO for LTE-Advanced", 3GPP Draft; R1-094250, 3rd Generation Partnership Project (3GPP), Mobile Competence Centre; 650, Route Des Lucioles; F-06921 Sophia-Antipolis Cedex; France, No. Miyazaki; Oct. 12, 2009, Oct. 12, 2009 (Oct. 12, 2009), pp. 1-17, XP050388713, [retrieved on Oct. 6, 2009].
International Search Report and Written Opinion—PCT/US2015/028931—ISA/EPO—Oct. 23, 2015. (30 total pages).
Motorola: "LTE Control Channel Configuration Signaling and DRX", 3GPP Draft; R1-074003—PHICH SIB-MIB Signaling & DRX, 3rd Generation Partnership Project (3GPP), Mobile Competence Centre; 650, Route Des Lucioles; F-06921 Sophia-Antipolis Cedex; France, vol. RAN WG1, No. Shanghai, China; Oct. 2, 2007, Oct. 2, 2007 (Oct. 2, 2007), 3 Pages, XP050107556, [retrieved on Oct. 2, 2007].
NEC Group: "DM-RS Antenna Port Association with ePDCCH Transmission", 3GPP Draft; R1-122594, 3rd Generation Partnership Project (3GPP), Mobile Competence Centre; 650, Route Des Lucioles; F-06921 Sophia-Antipolis Cedex; France, vol. RAN WG1, No. Prague, Czech Republic; May 21-25, 2012, May 12, 2012 (May 12, 2012), 3 Pages, XP050600780, [retrieved on May 12, 2012].
Samsung: "PUCCH Format 1a/1b Resources in Response to ePDCCH Detections", 3GPP Draft; R1-123491 A_N for EPDCCH, 3rd Generation Partnership Project (3GPP), Mobile Competence Centre; 650, Route Des Lucioles; F-06921 Sophia-Antipolis Cedex; France, vol. RAN WG1, No. Qingdao, China; Aug. 13-17, 2012, Aug. 5, 2012 (Aug. 5, 2012), 3 Pages, XP050661370, Retrieved from the Internet: URL: http://www.3gpp.org/ftp/tsg_ran/WG1_RL1/TSGR1_70/Docs/ [retrieved on Aug. 5, 2012].
Texas Instruments: "Issues on Carrier Aggregation for Advanced E-UTRA", 3GPP Draft, R1-090280 TI Carrier AGGR, 3rd Generation Partnership Project (3GPP), Mobile Competence Centre, 650, Route Des Lucioles, F-06921 Sophia-Antipolis Cedex, France, No. Ljubljana, Jan. 7, 2009, Jan. 7, 2009 (Jan. 7, 2009), XP050318205, pp. 1-5, [retrieved on Jan. 7, 2009].
ZTE: "Aspects on DL Control Signaling Enhancements", 3GPP Draft; R1-112270, 3rd Generation Partnership Project (3GPP), Mobile Competence Centre; 650, Route Des Lucioles ; F-06921 Sophia-Antipolis Cedex; France, vol. RAN WG1, No. Athens, Greece; Aug. 22, 2011, Aug. 17, 2011 (Aug. 17, 2011), 7 Pages, XP050537754, [retrieved on Aug. 17, 2011].
European Search Report—EP20210431—Search Authority—Munich—dated May 11, 2021.

* cited by examiner

TECHNIQUES FOR IMPROVING CONTROL CHANNEL CAPACITY

CLAIM OF PRIORITY UNDER 35 U.S.C. § 119

The present application for patent claims priority to Provisional Application No. 61/987,867 entitled "APPARATUS AND METHOD FOR IMPROVING CONTROL CHANNEL CAPACITY" filed May 2, 2014, which is assigned to the assignee hereof and hereby expressly incorporated by reference herein.

INTRODUCTION

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple user equipment devices (UE). Each UE communicates with one or more base stations via transmissions on the forward and reverse links. The forward link (or downlink) refers to the communication link from the base stations to the UEs, and the reverse link (or uplink) refers to the communication link from the UEs to the base stations. This communication link may be established via a single-in-single-out, multiple-in-single-out or a multiple-in-multiple-out (MIMO) system.

In an example, base stations can allocate certain resources for transmitting control data to and/or receiving control data from the UEs. In some implementations, the control data resources are allocated as part of user-plane data resources. For example, in LTE, a base station can reserve, e.g., one to three OFDM symbols in a subframe for communicating control data. The number of OFDM symbols to reserve can be based at least in part on a number of UEs served by the base station. The more OFDM symbols that are reserved in the subframe for communicating control data, the less the number of OFDM symbols in the subframe available for user-plane data, which can have a greater the impact on user-plane data throughput at the base station.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for demodulating control data in wireless communications is provided. The method includes receiving, at a device, a signal from an access point comprising at least one control data resource, determining one of a plurality of modulation schemes utilized to modulate the at least one control data resource in the signal, determining a layer associated with modulation of control data for the device, and demodulating the signal according to the one of the plurality of modulation schemes and the layer to obtain control data in the at least one control data resource.

In another example, an apparatus for demodulating control data in wireless communications is provided. The apparatus includes a receiving component configured to receive, at a device, a signal from an access point comprising at least one control data resource, a modulation determining component configured to determine one of a plurality of modulation schemes utilized to modulate the at least one control data resource in the signal and determine a layer associated with modulation of control data for the device, and a demodulating component configured to demodulate the signal according to the one of the plurality of modulation schemes and the layer to obtain control data in the at least one control data resource.

In yet another example, a method for modulating control data in wireless communications is provided. The method includes modulating first control data for a first device in an enhancement layer of a control data resource based at least in part on whether the control data resource includes second control data for a second device, and transmitting at least the first control data as modulated over the control data resource.

In another example, an apparatus for modulating control data in wireless communications is provided. The apparatus includes a modulating component configured to modulate first control data for a first device in an enhancement layer of a control data resource based at least in part on whether the control data resource includes second control data for a second device, and a transmitting component configured to transmit at least the first control data as modulated over the control data resource.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Figure 1:
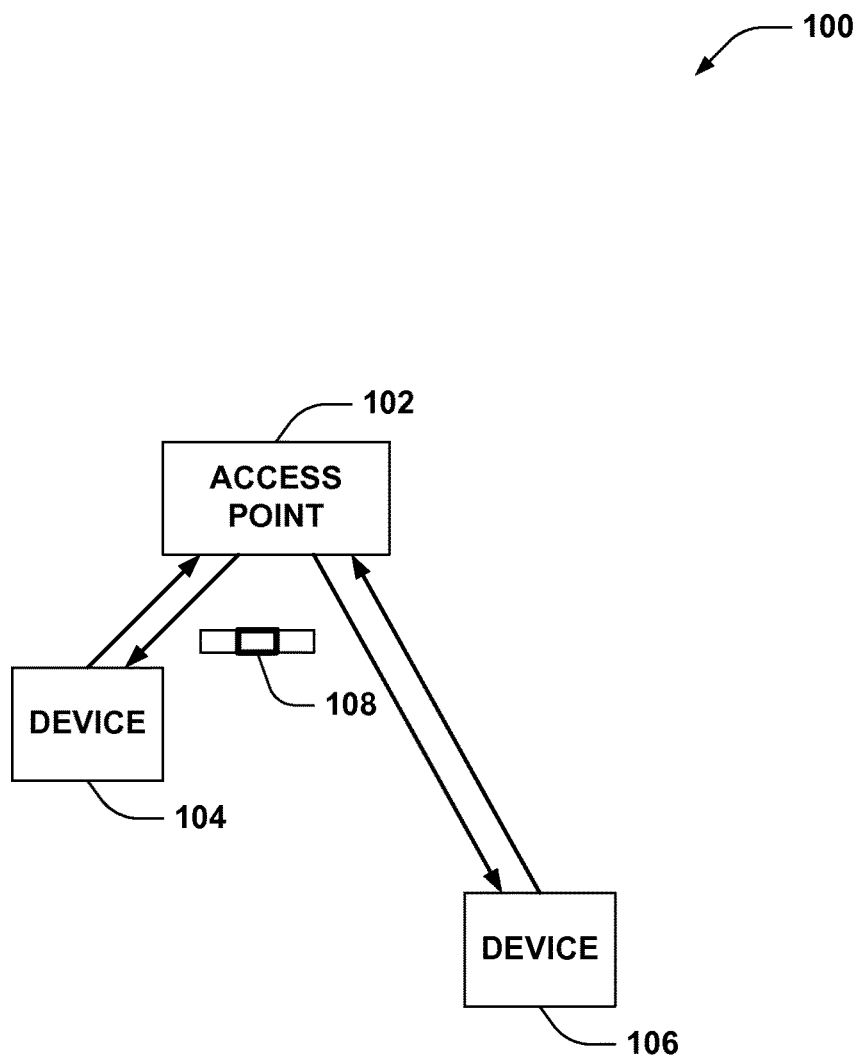
FIG. 1 illustrates an example system for modulating control data for multiple devices over similar control resources.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Described herein are various aspects related to facilitating increasing control channel capacity in wireless communications. For example, a base station can communicate control data to various devices by using multiple layer modulation for a control data resource. For example, the multiple layer modulation can include a plurality of layers (e.g., a base layer and one or more enhancement layers), where each layer corresponds to a modulation of control data for transmitting in a control data resource. The plurality of layers can be superpositioned to generate the multiple layer modulation. Thus, the term "layer" or "modulation layer" as used herein may refer to a modulation of control data that can be superpositioned with one or more other layers to generate a multiple layer modulation of control data. In this regard, each layer of the plurality of layers may be used to carry control data for different devices over the control data resource, which may result in lower control data resource usage. In one example, different modulation schemes can be utilized in the multiple layer modulation for at least a portion of the control data resources.

In one specific example, the base station can pair a device having a strong signal to base station with another device having a weak signal, and can multiplex at least a portion of control data for the device with the strong signal in control resources utilized to communicate other control data to the device having the weak signal by using the multiple layer modulation. In another example, the base station can pair two devices having a strong signal to the base station for communicating control data over similar resources thereto by using the multiple layer modulation. In this example, the base station can multiplex the control data for the devices using one or more modulation schemes that allow for communicating sufficient bits to handle the control data for both devices over multiple layers. By multiplexing control data for multiple devices over control data resources, capacity of the resources is increased. For example, in a system such as LTE where control data symbols are reserved in the same subframe used to transmit, e.g., user-plane data, this can result in less control data symbols reserved for transmitting control data, and thus increased capacity for user-plane data.

As used in this application, the terms "component," "module," "system" and the like are intended to include a computer-related entity, such as but not limited to hardware, software/firmware, a combination of hardware and software/firmware, or software/firmware in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, user equipment (UE), or user equipment device. A wireless terminal can be a cellular telephone (e.g., a smart phone), a satellite phone, a cordless telephone, a tablet, a netbook, a smartbook, an ultrabook, a Session Initiation Protocol (SIP) phone, a wireless local loop (WLL) station, a personal digital assistant (PDA), a handheld device having wireless connection capability, a gaming device, a navigation device, a computing device, a robot, a drone, a wearable device (e.g., a smart watch, a smart bracelet or other smart jewelry, smart clothing), other processing devices coupled to a wireless modem, etc. Moreover, various aspects are described herein in connection with a base station. A base station can be utilized for communicating with wireless terminal(s) and can also be referred to as an access point, access node, a Node B, evolved Node B (eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

Referring to FIG. 1, a wireless communication system 100 is illustrated that facilitates communicating control data. System 100 can include an access point 102 that provides wireless network access to one or more devices, such as device 104 and/or 106. Access point 102 can be substantially any access point, such as a macrocell, small cell, or similar base station, a mobile base station, a Wi-Fi hotspot, a device (e.g., communicating in peer-to-peer or ad-hoc mode), a portion thereof, and/or the like, and can also communicate with one or more core network components (not shown) to provide network access to the device 104 and/or 106. As used herein, the term "small cell" may refer to an access point or to a corresponding coverage area of the access point, where the access point in this case has a relatively low transmit power or relatively small coverage as compared to, for example, the transmit power or coverage area of a macro network access point or macro cell. For instance, a macro cell may cover a relatively large geographic area, such as, but not limited to, several kilometers in radius. In contrast, a small cell may cover a relatively small geographic area, such as, but not limited to, a home, a building, or a floor of a building. As such, a small cell may include, but is not limited to, an apparatus such as a BS, an access point, a femto node, a femtocell, a pico node, a micro node, a Node B, eNB, home Node B (HNB) or home evolved Node B (HeNB). Therefore, the term "small cell," as used herein, refers to a relatively low transmit power and/or a relatively small coverage area cell as compared to a macro cell. Devices 104 and 106 can each be a UE or other mobile device, modem (or other tethered device), a portion thereof, and/or the like.

According to an example, access point 102 can establish one or more logical channels with devices 104 and/or 106 for communicating therewith, as further described herein. For example, the logical channels can relate to communicating control data, user-plane data, and/or the like over uplink or downlink resources, and can be defined by one or more frequency and/or time resources. In one example, access point 102 can communicate with devices 104 and/or 106 using OFDM, and thus the channels can correlate to one or more OFDM symbols, or portions thereof, in a communication frame. In this example, data to be communicated from the access point 102 in the one or more OFDM symbols can be modulated using one or more modulation schemes, and transmitted as a signal, which can be received at devices 104 and 106. Devices 104 and/or 106 can then demodulate the signals, e.g., using the modulation scheme (or, e.g., a reverse thereof) to obtain an estimate of the OFDM symbols for processing the related data. The more control data to be transmitted, however, the more OFDM symbols are to be used for transmitting control data, which can impact user-plane data throughput in some wireless systems.

Thus, in one example, access point 102 can utilize at least a portion of similar control data resources 108 to communicate control data to both devices 104 and 106. For example, access point 102 can pair or otherwise group devices to receive control data over the similar resources 108. For example, control data resources may include a control channel element (CCE), enhanced CCE (eCCE), etc. for physical downlink control channel (PDCCH) and/or enhanced PDCCH (ePDCCH) communications in LTE, or a similar portion of a signal that comprises control data, and/or the like. Access point 102, in one example, can perform multiple modulations of the similar resources 108 to provide multiple layers for multiple layer modulation, where each layer can include control data for device 104 or 106. In addition, in an example, access point 102 may utilize a different modulation scheme for each of the multiple layers over the similar resources 108. In either case, access point 102 can superposition the modulated symbols to provide multiple layer modulation in facilitating communication of additional information (e.g., additional data bits) that can be processed by device 104 and/or 106.

In one specific example, as described further herein, access point 102 can pair the devices 104 and 106 based at least in part on feedback reported by the devices. In an example, access point 102 can pair device 104 reporting feedback above a threshold level with device 106 reporting feedback below another threshold level (e.g., where device 104 experiences a strong signal quality or channel state condition, and device 106 experiences a weak signal quality or channel state condition with access point 102). In another example, devices 104 and 106 can both report channel conditions above a threshold level, etc., as described further herein. Using similar resources 108 to communicate control data in this regard, for example, can increase control channel capacity, which can conserve OFDM symbols, and thus leave additional OFDM symbols for communicating user-plane data. Not only can this improve performance for user-plane data, but this can also allow access point 102 to communicate with more devices.

Figure 2:
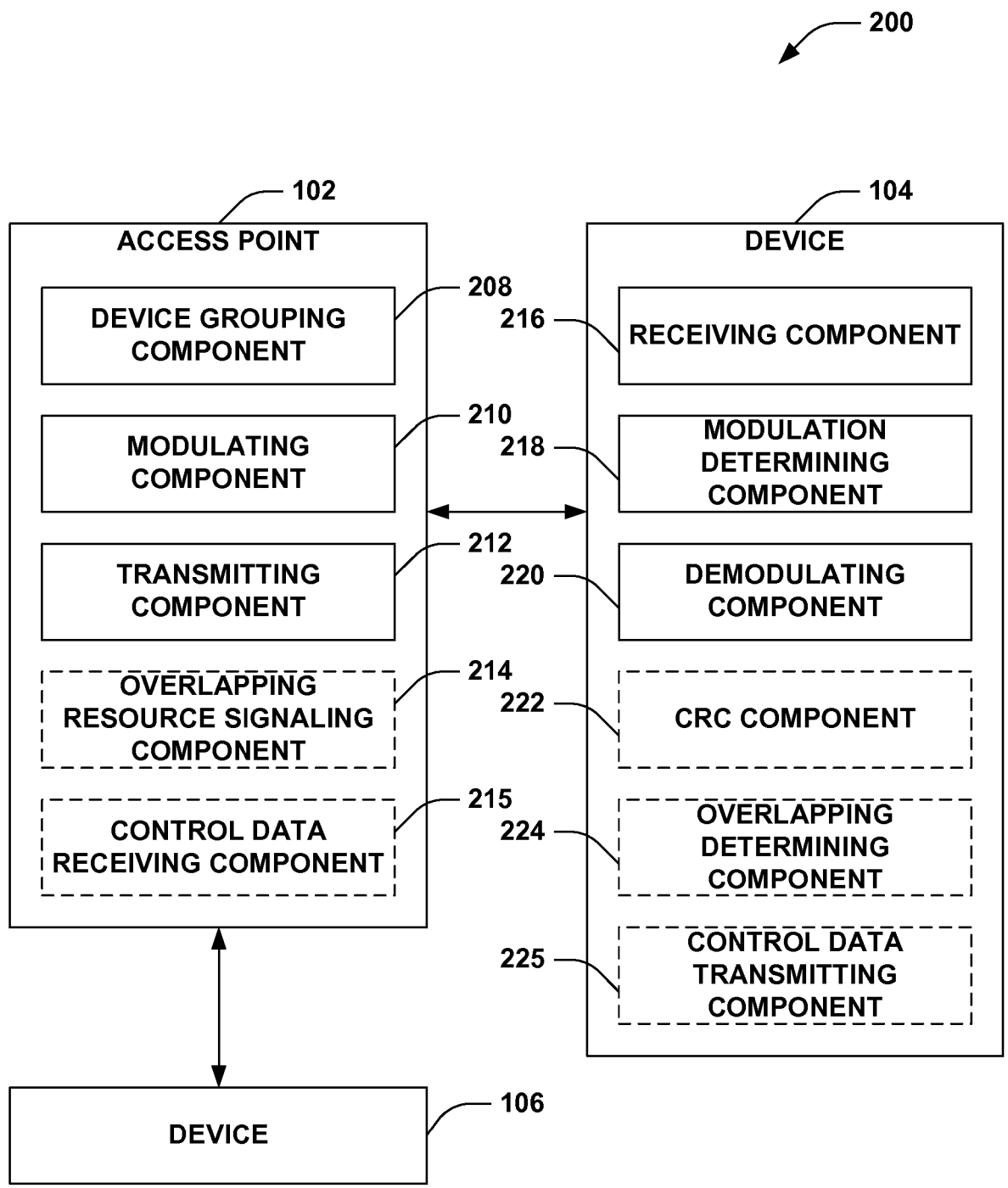
FIG. 2 illustrates an example system for modulating control data for multiple devices using a control data resource.

Turning now to FIG. 2, an example wireless communication system 200 that facilitates multiplexing control data for multiple devices over similar resources is illustrated. System 200 can include an access point 102 that provides wireless network access to one or more devices, such as device 104 and/or 106. Access point 102 can be a macrocell, small cell, mobile base station, etc., and devices 104 and 106 can each be a UE, modem, etc.

Access point 102 can include a device grouping component 208 for associating a plurality of devices for multiplexing control data intended for the devices, a modulating component 210 for modulating and/or multiplexing control data for the devices according to one or more modulation schemes, and a transmitting component 212 for communicating signals including the modulated control data. Access point 102 can optionally include an overlapping resource signaling component 214 for indicating one or more resources over which control data is overlapped (e.g., using multiple layer modulation) for the devices, and/or a control data receiving component 215 for receiving control data from the devices based on a layer assigned to the device in multiple layer modulation.

Device 104 can include a receiving component 216 for obtaining signals transmitted by an access point or other signals, a modulation determining component 218 for determining a layer and/or a related modulation scheme utilized by the access point to encode the control data for device 104, and a demodulating component 220 for demodulating the control data from the received signals based on the layer and/or modulation scheme. Device 104 can optionally include a cyclic redundancy check (CRC) component 222 for attempting to apply a CRC to the signals to determine the modulation scheme, an overlapping determining component 224 for receiving an indication of resources including overlapped control data (e.g., control data that is modulated over multiple layers using multiple layer modulation) for the device 104 and another device, and/or a control data transmitting component 225 for transmitting control data to the access point 102 in resources determined based at least in part on the layer and/or related modulation scheme for device 104. Device 106 can include similar components as device 104, which are not shown for ease of explanation.

According to an example, device grouping component 208 can determine to group device 104 with device 106 for transmitting control data thereto over multiple layers in multiple layer modulation. For example, grouping devices 104 and 106 can be based at least in part on feedback received from device 104 and device 106. Device grouping component 208 can determine to group a strong device (e.g., a device reporting channel feedback over a threshold level) with a weak device (e.g., a device reporting channel feedback under another threshold level). In another example, device grouping component 208 can group strong devices together, weak devices together, or otherwise group devices based on signal strength or other parameters for receiving control data over similar control data resources in one or more signals. For illustrative purposes, device 104 can be a strong device, and device 106 can be a weak device in certain examples described below, though it is to be appreciated that device 106 can also be a strong device and/or that the devices 104 and 106 may be grouped for communicating control data thereto over different layers regardless of signal strength (e.g., and/or based on other parameters).

In this example, modulating component 210 can multiplex control data for devices 104 and 106 using multiple layer modulation within similar control data resources, such as a single CCE or eCCE (e.g., for a PDCCH or ePDCCH, respectively), as described. In one example, modulating component 210 can use similar or different modulation schemes for devices 104 and 106, which can be superpositioned to provide multiple layer modulation. Transmitting component 212 can transmit the modulated signals for receipt by a receiver (e.g., receiving component 216) of devices 104 and/or 106. Receiving component 216 of device 104 can obtain the modulated signals, and modulation determining component 218 can decide which layer and/or corresponding modulation scheme is utilized by access point 102 to modulate control data for device 104. For example, the layer and/or modulation scheme may be indicated by the access point 102 (e.g., in signaling to the device 104, which may be related to assignment of the control data resources for the device 104, etc.). Based at least in part on determining the layer and/or modulation scheme, demodulating component 220 can demodulate the signals to yield related control data symbols for processing.

In a specific example, access point 102 can communicate with devices 104 and 106 using OFDM. Thus, for example, OFDM symbols, or portions thereof, can be utilized for formulating data to communicate to device 104 and/or 106 (e.g., over one or more logical communication channels). Modulating component 210 can modulate the OFDM symbols into signals, and demodulating component 220 can demodulate signals as received to produce the OFDM symbols. In this example, a portion of OFDM symbols can be reserved for transmitting control data. In LTE, for example, this can be, e.g., the first one to three OFDM symbols in a subframe. Access point 102 can, e.g., assign various devices a number of control data resources, such as CCEs, eCCEs, etc., in one or more OFDM symbols (or, e.g., in a collection of OFDM symbols in a given subframe) for receiving specific control data from access point 102. A CCE or eCCE, as referenced herein, can refer specifically to a portion of an OFDM symbol (e.g., one or more tones in the symbol period), or substantially any time/frequency resource used for communicating control data, for example.

In previous system designs, devices were assigned distinct CCEs. Device grouping component 208, however, can determine a plurality of devices for assigning at least a portion of similar control data resources for communicating control data thereto to increase capacity of the control region of OFDM symbols. In one example, modulating component 210 can perform multiple layer modulation of the control data resources to provide control data for multiple devices at each layer. It is to be appreciated that modulating component 210 may or may not select a different modulation scheme for each layer. In one example, modulating component 210 can typically utilize quadrature phase shift keying (QPSK) for modulating OFDM symbols into signals for transmission by transmitting component 212. For control data resources where device grouping component 208 determines to communicate control data for a plurality of devices, modulating component 210 can additionally or alternatively utilize 16-quadrature amplitude modulation (16-QAM) or another modulation scheme in providing multiple layer modulation for multiplexing the control data for the plurality of devices on each of the multiple layers.

In an example, modulating component 210 can assign device 104 to an enhancement layer in multiple layer modulation, and can accordingly modulate control data for device 104 in a control data resource by using 16-QAM, such that the control data for the device 104 occupies bits associated with the enhancement layer (e.g., a last two bits). Transmitting component 212 can transmit the modulated signals, as described. Receiving component 216 can obtain the signals, and modulation determining component 218 can determine that the device 104 is assigned to the enhancement layer for the associated control data resource, and that access point 102 utilized 16-QAM to modulate the signals. Demodulating component 220 can demodulate the received signals using 16-QAM to yield control data intended for device 104 in the enhancement layer (e.g., in the last two bits). In one example, modulating component 210 can also modulate other control data resources for the device 104 using QPSK, where the other control data resources do not include control data overlapped with control data for other devices. In this example, the control data for device 104 is assigned to the base layer (e.g., a first two bits), which can be the only layer where QPSK is used.

In one example, device 104 can be a strong device, as described above as a device having a signal strength that achieves a threshold, and device 106 can be a weak device, as described above as a device having a signal strength that does not achieve another threshold. In this example, modulating component 210 can modulate control data related to device 106 at a base layer (e.g., using QPSK), and/or can modulate control data for device 106 and/or device 104 at a base layer and enhancement layer, respectively (e.g., using 16-QAM). For example, device grouping component 208 can utilize a first 2 bits of a control data resource for modulating using QPSK as a base layer, to which control data for device 106 is assigned, and may use the second 2 bits for modulating using 16-QAM as an enhancement layer, to which control data for device 104 is assigned. The modulations can be superpositioned to provide multiple layer modulation, as described herein. Such modulating of control data for devices 104 and 106 can also be referred to herein as overlapping control data. In this example, device 106 can receive signals and demodulate using QPSK; thus, the addition of control data for device 104 using the latter 2 bits of a 16-QAM modulated control data resource (e.g., the enhancement layer) can be transparent to device 106, and device 106 can demodulate the first two bits (e.g., the base layer) using QPSK. For example, modulating component 210 can determine the layer assigned to device 104 and/or the associated modulation scheme based on feedback from the corresponding device regardless of whether control data is overlapped for devices in a given control data resource, in one example. In another example, modulating component 210 can additionally consider whether control data is overlapped in the control data resource for determining the modulation scheme.

For example, where modulating component 210 utilizes 16-QAM for strong devices (e.g., based on determining channel feedback from the device is at least at a threshold level), modulating component 210 can map the strong device control data to the latter 2-bits (e.g., the enhancement layer) of the 16-QAM modulated control data resource for communicating control data for device 104 (e.g., even if the control data resource only includes control data for device 104 and no other devices). Thus, modulation determining component 218 can determine that 16-QAM is used to modulate control data resources related to device 104 and that the device 104 is assigned to the enhancement layer, and demodulating component 220 can demodulate corresponding signals using 16-QAM to retrieve control data from the signals as the last 2 bits. In one example, strong devices can always be mapped to the enhancement layer, and thus modulation determining component 218 can determine that device 104 is mapped to the enhancement layer (and/or that 16-QAM is utilized to modulate the control data resource) based at least in part on the channel feedback reported by device 104. Thus, in this example, access point 102 need not notify the device 104 of the layer to which its control data is mapped.

In another example, modulating component 210 may utilize multiple layer modulation including 16-QAM for control data resources having overlapping control data, but may use QPSK modulation for control data resources that do not have overlapping control data. In this example, modulation determining component 218 can determine whether control data resources include overlapped control data, and demodulating component 220 can accordingly demodulate these control data resources using 16-QAM, obtaining control data for device 104 from the enhancement layer as described above, and can demodulate other control data resources that do not include overlapped control data using QPSK. For example, modulation determining component 218 can determine which control data resources have overlapped control data, and thus whether to use 16-QAM or QPSK to demodulate the control data, in a number of ways. In one example, modulation determining component 218 can utilize demodulating component 220 to blindly demodulate the control data resources using QPSK and 16-QAM, and can determine which demodulation is correct based at least in part on the resulting symbol (e.g., based on evaluating the tones within the symbol). For example, this can include determining which modulation is correct based at least in part on a random sequence generated by the demodulation. In either case, where modulation determining component 218 determines that 16-QAM is to be used in demodulating the control data resources, demodulating component 220 can demodulate the control data resources using 16-QAM and can obtain control data for device 104 from the enhancement layer associated therewith, as described.

In another example for determining which control data resources have overlapped control data (e.g., and thus use 16-QAM for modulation), CRC component 222 can perform a CRC over a QPSK demodulation of a portion of the control data resources and over a 16-QAM demodulation of the portion of the control data resources to determine which yields a successful CRC. The portion of the control data resources can include a first CCE/eCCE and/or a second CCE/eCCE, as described herein. In this example, modulating component 210 could have added CRC information to the transmitted signals, which CRC component 222 can utilize to verify integrity of the signal as received and demodulated. For example, where one of the CRCs pass, there can be a high probability that the associated modulation scheme utilized to demodulate the portion of the control data resources is the correct one. For example, CRC component 222 can perform CRC for each control data resource assigned to device 104 to determine the correct modulation scheme. In yet another example, overlapping resource signaling component 214 can signal a modulation scheme utilized by modulating component 210 in additional control data resources (e.g., as a single or multiple bit indicator corresponding to the modulation scheme). Overlapping determining component 224 can receive the control data resources and accordingly determine the indicated modulation scheme(s) utilized in modulating each portion of the control data resources such to perform proper demodulation of the control data resources.

In addition, in an example, modulating component 210 can use 16-QAM for modulating control data to a device regardless of whether a control data resource includes overlapped control data. In this example, modulating component 210 can modulate control data for device 104 using 16-QAM. For control data resources that do not include overlapped control data for device 106, for example, modulating component 210 can utilize all four bits of 16-QAM (e.g., the base layer and the enhancement layer) for communicating control data in the control data resource for device 104. Similarly, in this example, modulation determining component 218 can determine which control data resources include overlapped control data and/or which do not. For example, this can be determined based at least in part an indication received from overlapping resource signaling component 214 (e.g., as a single or multiple bit indicator corresponding to the modulation scheme. In another example, where the bits associated with the two control data resources are represented as (x1, x2) and (y1, y2), where x1, y1 are for the base layer, and x2, y2 are for the enhancement layer, CRC component 222 can check which of the 4 possibilities passes CRC test: e.g., (x1 x2 y1 y2), (x1 x2 y2), (x2 y2), (x2 y1 y2), and can assume the possibility that passes represents the layers utilized in modulating the control data for device 104.

It is to be appreciated, for example, that device grouping component 208 may determine to not group devices for transmitting an initial control data resource for a downlink grant, as devices may use a position of the initial control data resource in determining resource information for transmitting a physical uplink control channel (PUCCH)/enhanced PUCCH (ePUCCH). In another example, however, devices can be grouped as described above, and a layer selected for modulating control data for a given device (e.g., by modulating component 210) may be used to determine resource information for transmitting the PUCCH/ePUCCH by the given device (e.g., along with the position of the initial control data resource). Accordingly, in this example, modulation determining component 218 can determine the modulation layer utilized for the device 104, and control data transmitting component 225 may use this information in determining resource information for transmitting a PUCCH/ePUCCH to the access point 102. For example, where the PDCCH/ePDCCH is in an enhancement layer for device 104, modulation determining component 218 can determine the control data for device 104 is in the enhancement layer, as described, and control data transmitting component 225 can determine the PUCCH/ePUCCH resource based not only on the position of the PDCCH/ePDCCH, but also the fact that the control data for device 104 is in the enhancement layer. In one example, control data transmitting component 225 can apply a configured offset, function, or other parameter to determine the PUCCH/ePUCCH resource based on determining the control data is in the enhancement layer, as distinguished from another device having control data in the base layer of the same PDCCH/ePDCCH, which may not apply the offset or may apply a different offset, function, or other parameter. In either case, control data transmitting component 225 can transmit control data to access point 102, and control data receiving component 215 can receive the control data from the device 104 in the resources determined based at least in part on the layer assigned for modulating control data for device 104 in the PDCCH/ePDCCH.

In yet another example, a device-specific search space for PDCCH/ePDCCH may be defined based not only on an identifier of the device (e.g., a radio network temporary identifier (RNTI)) and a candidate index, but also the modulation layer related to the PDCCH/ePDCCH resource for the device. Thus, in one example, receiving component 216 can search for the PDCCH/ePDCCH in a search space defined by the RNTI assigned to device 104, candidate index, and modulation layer. In this regard, transmitting component 212 can transmit the PDCCH/ePDCCH in the search space defined by the RNTI assigned to device 104, the candidate index, and the modulation layer. In an example, overlapping resource signaling component 214 may signal an indication of the modulation layer to device 104 (e.g., in radio resource control (RRC), layer 1, or similar signaling), which overlapping determining component 224 may receive for determining the PDCCH/ePDCCH search space for device 104. In another example, receiving component 216 can perform blind decoding to determine the modulation layer and/or search space.

Figure 3:
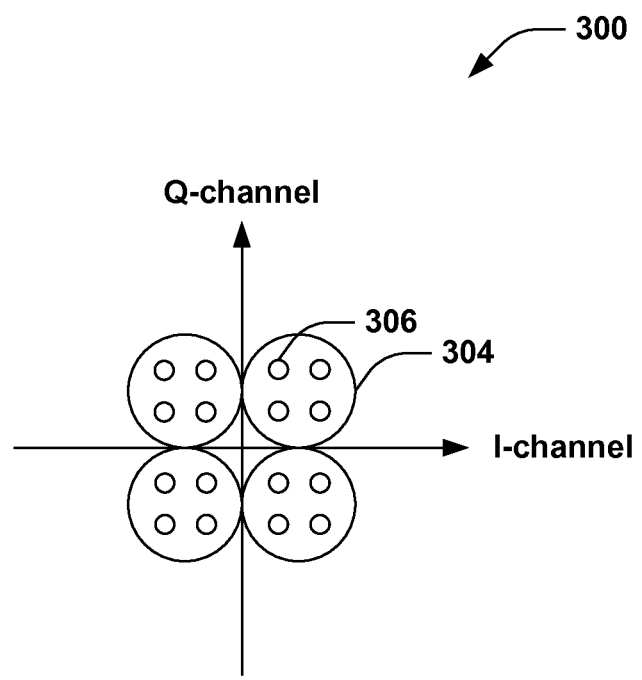
FIG. 3 illustrates example graphical representations of modulation schemes for modulating control data for multiple devices.
Figure 3:
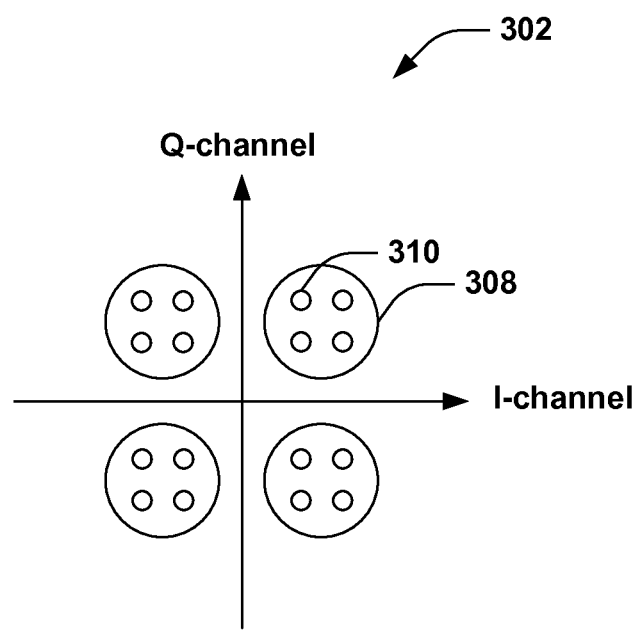

FIG. 3 illustrates example graphical representations of modulation schemes 300 and 302 for providing multiple layer modulation of control data for multiple devices. For example, modulation scheme 300 can be 16-QAM having four clusters 304, each with four modulation points 306, represented over a Q-channel and an I-channel. In this example, the four clusters 304 can be adjacent, and the four modulation points 306 evenly spaced within each cluster 304. For example, the clusters 304 can be used to modulate data for a first device (e.g., a weak device) using QPSK, while modulation points within the four clusters 304 can be used to modulate data for a second device (e.g., a strong device) using 16-QAM.

In another example, modulation scheme 302 can be used to modulate control data for multiple devices. In this example, the clusters 308 are spaced farther apart than in modulation scheme 300, while having the same space between modulation points 310. Thus, for example, an access point can determine a distance between clusters to represent control data for a device (e.g., the weak device), and can determine relative position of the modulation points within the clusters to represent control data for another device (e.g., the strong device). In one example, the access point can utilize a further distance between clusters for weaker devices and a smaller relative position of modulation points within the clusters for stronger devices. Moreover, though shown and described as 16-QAM, it is to be appreciated that the access point can utilize substantially any modulation scheme greater (e.g., modulation order larger) than QPSK (e.g., 64-QAM, etc.) to provide multiple layer modulation of control data for the multiple devices.

Referring to FIGS. 4A-6, example methodologies for modulating control data for multiple devices in single control signal units are illustrated. While, for purposes of simplicity of explanation, the methodologies are shown and described as a series of acts, it is to be understood and appreciated that the methodologies are not limited by the order of acts, as some acts may, in accordance with one or more embodiments, occur concurrently with other acts and/or in different orders from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

Figure 4A:
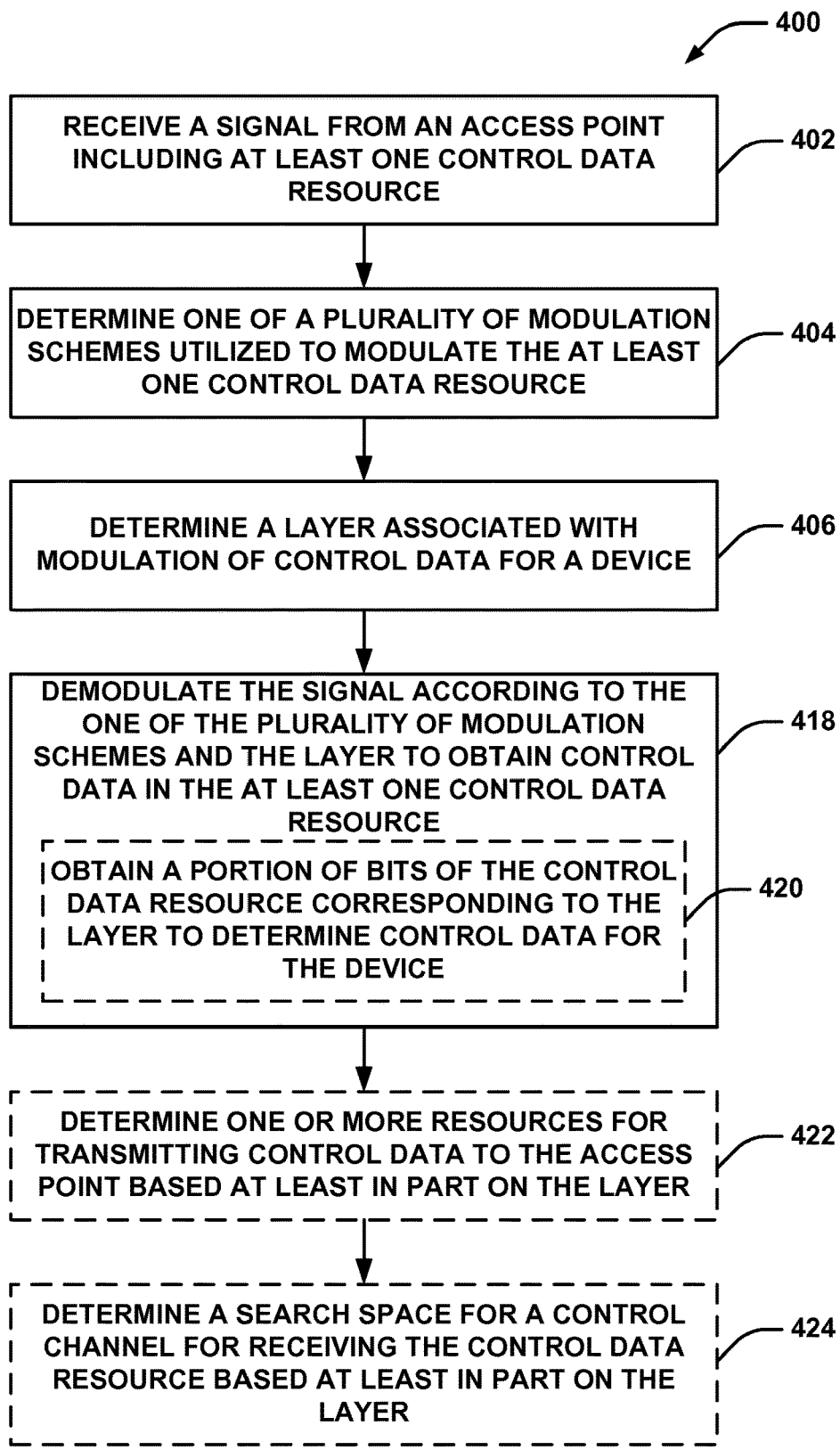
FIGS. 4A and 4B illustrates an example methodology for demodulating a received signal to determine control data.
Figure 4B:
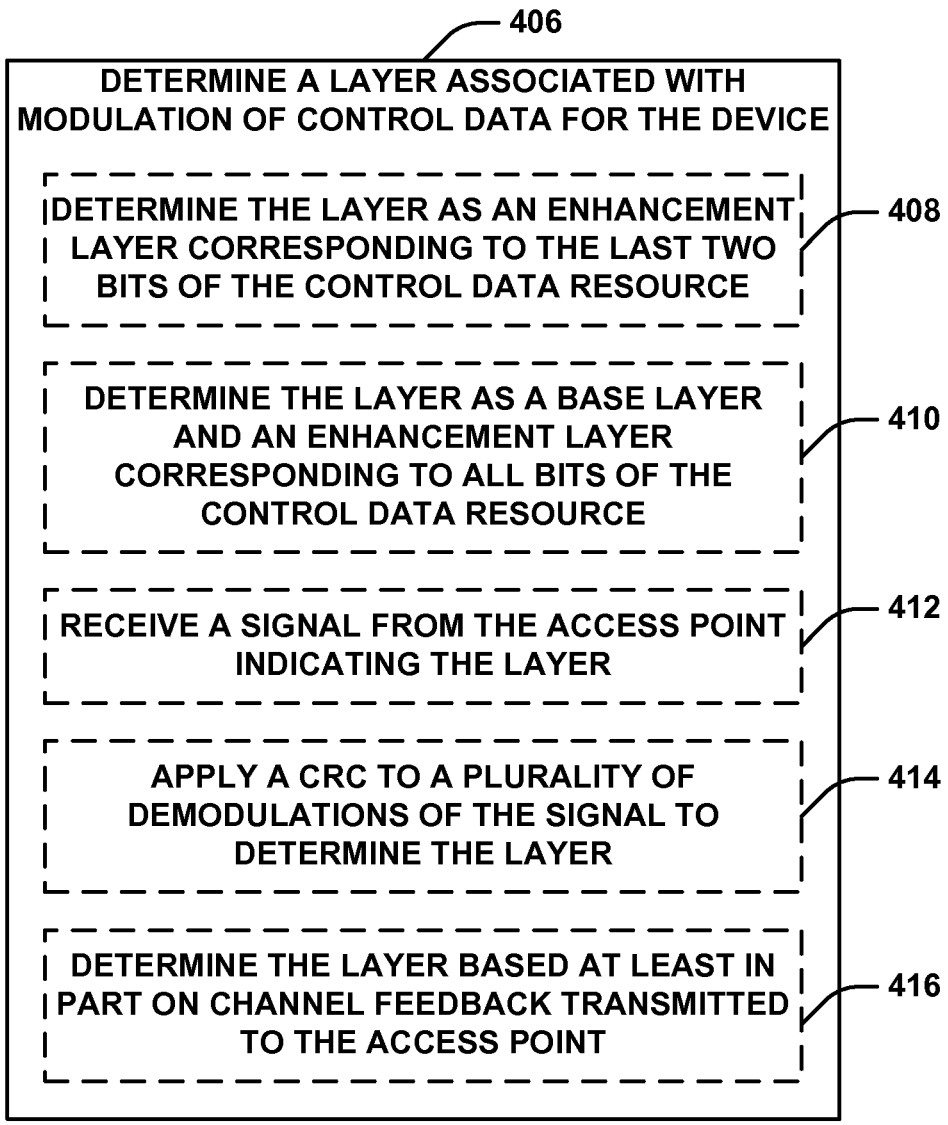

Referring to FIGS. 4A and 4B, an example methodology 400 that facilitates demodulating a signal possibly including control data for a plurality of devices is illustrated. At 402, a signal including at least one control data resource can be received from an access point. As described, the signal can be received over resources reserved for communicating control data (e.g., by a receiving component 216 of a device). In addition, the control data resource can correspond to a CCE, eCCE, etc., for example. Moreover, as described, the signal may be modulated using multiple layer modulation to indicate control data for multiple devices at different modulation layers of a control data resource.

At 404, one of a plurality of modulation schemes utilized to modulate the at least one control data resource in the signal can be determined (e.g., by a modulation determining component 218 of a device). As described, for example, determining the modulation scheme can include receiving an indication of the modulation scheme (e.g., from the access point in other control data or otherwise). In another example, determining the modulation scheme may include attempting to decode the control data resource, or related portion of the signal, using a plurality of modulation schemes, and determining which modulation scheme results in a successful decoding.

At 406, a layer associated with modulation of control data for a device can be determined (e.g., by a modulation determining component 218 of a device). For example, as shown in FIG. 4B, this can include, at 408, determining the layer as an enhancement layer corresponding to the last two bits of the control data resource. As described, modulation determining component 218 can determine the layer for device 104 as an enhancement layer in 16-QAM regardless of whether the control data resource includes overlapped control data for another device. In another example, modulation determining component 218 can determine the layer for device 104 as an enhancement layer in 16-QAM when the control data resource is overlapped with control data for another device (e.g., or otherwise as a base layer in QPSK modulation). In a further example, determining the layer at 406 may include, at 410, determining the layer as a base layer and an enhancement layer corresponding to all bits of the control data resource. Thus, for example, modulation determining component 218 can determine the layer as the base and enhancement layer in 16-QAM where the control data resource is not overlapped with control data for another device.

As determining the layer may be based on whether the control data resource includes overlapping control data, determining the layer at 406 may include, at 412, receiving a signal from the access point indicating the layer. For example, as described, the signal can indicate whether control data for the device is mapped to the enhancement layer, or more generally whether the control data resource includes overlapped control data, from which the device may determine an associated layer. In another example, determining the layer at 406 may include, at 414, applying a CRC to a plurality of demodulations of the signal to determine the layer. As described, it can be determined whether one or more control data resources are overlapping based on applying the CRC, and the layer can be determined based at least in part on whether the control data resource is overlapped (e.g., an enhancement layer where the control data resource is overlapped, a base layer otherwise, etc., as described).

Moreover, in an example, determining the layer at 406 may include, at 416, determining the layer based at least in part on channel feedback transmitted to the access point. In an example, a device can determine that its control data is mapped to an enhancement layer based at least in part on determining that the device reported channel feedback achieving a threshold level to the access point.

Referring back to FIG. 4A, at 418, the signal can be demodulated according to the one of the plurality of modulation schemes and the layer to obtain control data in the at least one control data resource (e.g., by a demodulating component 220 of a device). As described, the signal can be modulated using a plurality of modulation schemes in a multiple layer modulation, such as QPSK, 16-QAM, etc. Each layer can include control data for a given device, and thus demodulating the signal according to the determined modulation scheme and layer can yield the control data for a specific device. Demodulating the signal at 418 may include, at 420, obtaining a portion of bits of the control data resource corresponding to the layer to determine control data for the device. For example, the enhancement layer can correspond to a last two bits of the control data resource and the base layer can correspond to a first two bits, as described.

Optionally, at 422, one or more resources for transmitting control data to the access point maybe determined based at least in part on the layer (e.g., by a control data transmitting component 225). As described, for example, PUCCH/ePUCCH resources for transmitting control data may be determined based on the resources over which PDCCH/ePDCCH control data resources are received, and additionally on whether the PDCCH/ePDCCH is in a base layer or an enhancement layer. This can avoid conflict over PUCCH/ePUCCH resources for devices that receive overlapped control data in the same PDCCH/ePDCCH resource.

Optionally, at 424, a search space can be determined for a control channel for receiving the control data resource based at least in part on the layer (e.g., by a receiving component 216 of a device). As described, for example, a search space for locating the PDCCH resources for the device can be determined based at least in part on RNTI assigned to device 104, candidate index, and modulation layer. For example, the device can search the PDCCH in additional search space indexed by the determined modulation layer.

Figure 5:
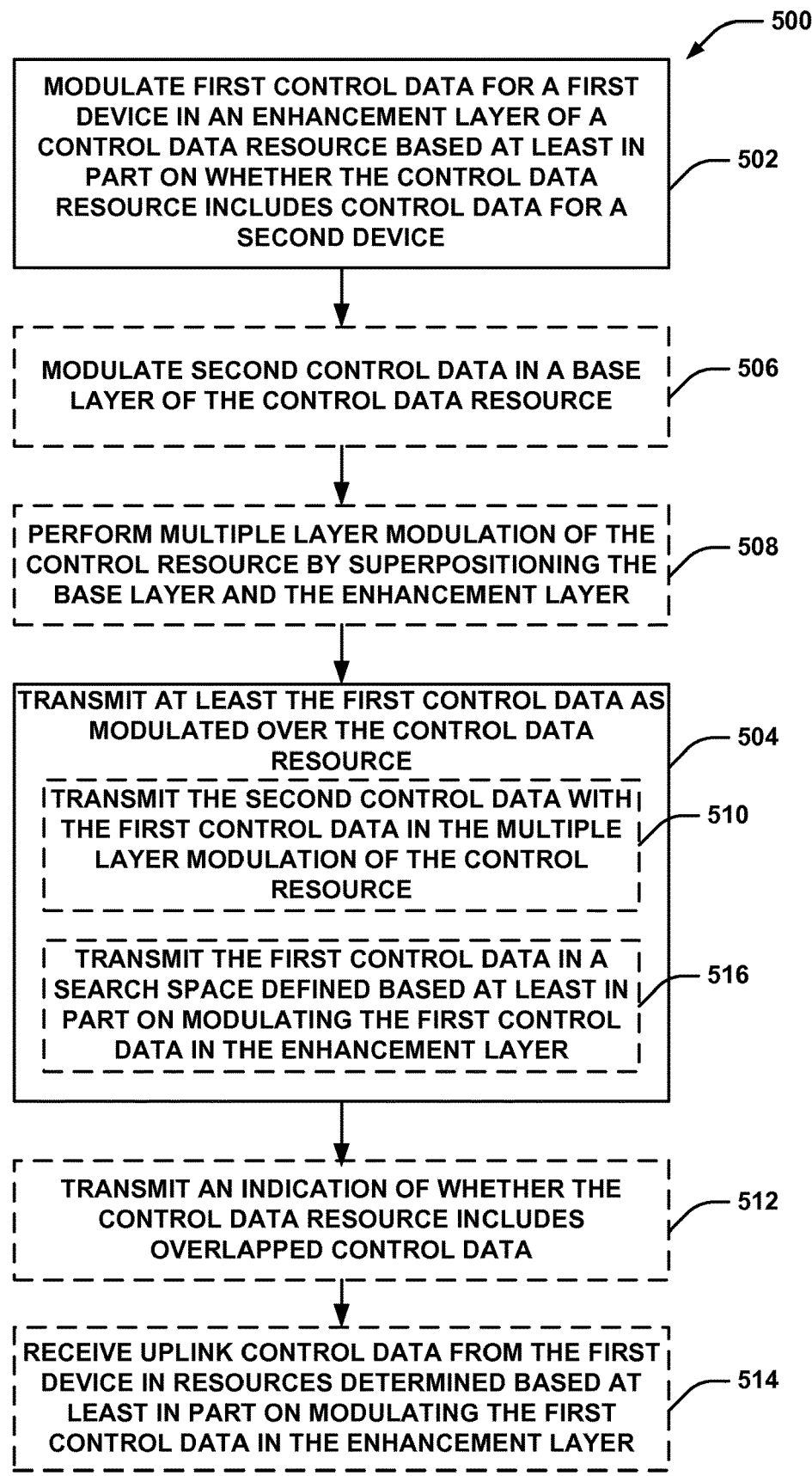
FIG. 5 illustrates an example methodology for modulating control data for multiple devices in a control data resource.

Turning to FIG. 5, an example methodology 500 that facilitates modulating a control data in a control data resource is shown. At 502, first control data for a first device can be modulated in an enhancement layer of a control data resource based at least in part on whether the control data resource includes control data for a second device (e.g., by a modulating component 210 of an access point). For example, as described, the modulating component 210 can modulate control data for the first device in an enhancement layer using 16-QAM modulation for the layer in multiple layer modulation. In this regard, the last two bits of the control data resource can be modulated for the first device. Modulating component 210 can modulate control data for the first device in the enhancement layer where it determines to also modulate control data for the second device in the control data resource (e.g., in a base layer). In another example, modulating component 210 can modulate control data the first device in the enhancement layer regardless of whether control data for another device is modulated in the control data resource.

At 504, at least the first control data as modulated over the control data resource can be transmitted (e.g., by a transmitting component 212). Optionally, at 506, second control data can be modulated in a base layer of the control data resource (e.g., by a modulating component 210 of an access point). For example, the second control data can be modulated using QPSK, as described, where the control data relates to a second device. In another example, the second control data can be modulated as the first two bits of the control data resource using 16-QAM, where the control data relates to the first device and no control data is to be overlapped in the control data resource. Optionally, at 508, multiple layer modulation of the control resource can be performed by superpositioning the base layer and the enhancement layer (e.g., by a modulating component 210 of an access point). In addition, transmitting at least the first control channel at 504 may optionally include, at 510, transmitting the second control data with the first control data in the multiple layer modulation of the control resource. Thus, transmitting control data for multiple devices in a control data resource can improve control data resource usage, as described, which can increase data throughput by allowing increased usage of data resources.

Optionally, at 512, an indication of whether the control data resource includes overlapped control data can be transmitted (e.g., by a transmitting component 212 of an access point). This can assist the device in determining a layer and/or modulation scheme applied to the control data for the device, as described.

Optionally, at 514, uplink control data can be received from the first device in resources determined based at least in part on modulating the first control data in the enhancement layer (e.g., by a control data receiving component 215). For example, as described, the device can transmit control data in PUCCH resources determined based on the device control data being mapped to the enhancement layer (e.g., and/or based on an aspect of the control data resource). Thus, this uplink control data can be received over the resources determined based on the device control data being mapped to the enhancement layer (e.g., as opposed to the base layer or another layer).

Transmitting the first control data may optionally include, at 516, transmitting the first control data in a search space defined based at least in part on modulating the first control data in the enhancement layer (e.g., by a transmitting component 212 of an access point). Accordingly, a related device can determine the resources for receiving the first control data (e.g., the control data resource) based at least in part on the first control data being mapped to the enhancement layer (e.g., in addition to an RNTI, assigned to the device and/or a candidate index).

Figure 6:
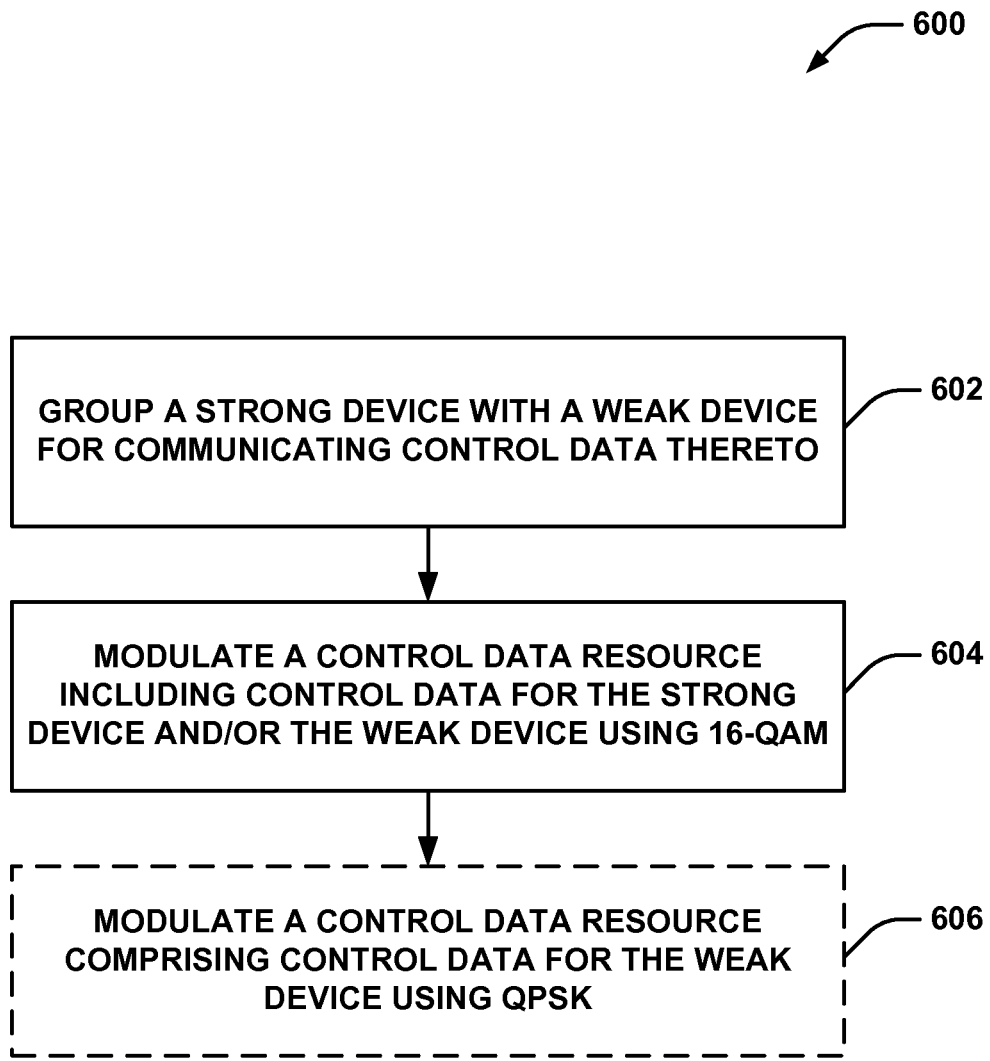
FIG. 6 illustrates an example methodology for modulating various control data resources.

Referring to FIG. 6, an example methodology 600 is shown that facilitates modulating control data for a pair of devices in a single control data resource. At 602, a strong device can be grouped with a weak device for communicating control data thereto (e.g., by a device grouping component 208 of an access point). As described, for example, the strong and weak devices can be determined based at least in part on received channel feedback. At 604, a CCE including control data for the strong device and/or the weak device can be modulated using 16-QAM (e.g., by a modulating component 210 of an access point). As described, for example, the first two bits (e.g., at a first layer) of the 16-QAM modulation can be used to convey control data for the first device, and the second two bits (e.g., at a second layer) can be used to convey control data for the second device. Optionally, at 606, a control data resource including control data for the weak device can be modulated using QPSK. Thus, in this example, the enhancement layer of 16-QAM can include control data for both devices and the base layer of QPSK can include control data for the weak device, such as to ensure the weak device can demodulate its control data at least using QPSK.

Figure 7:
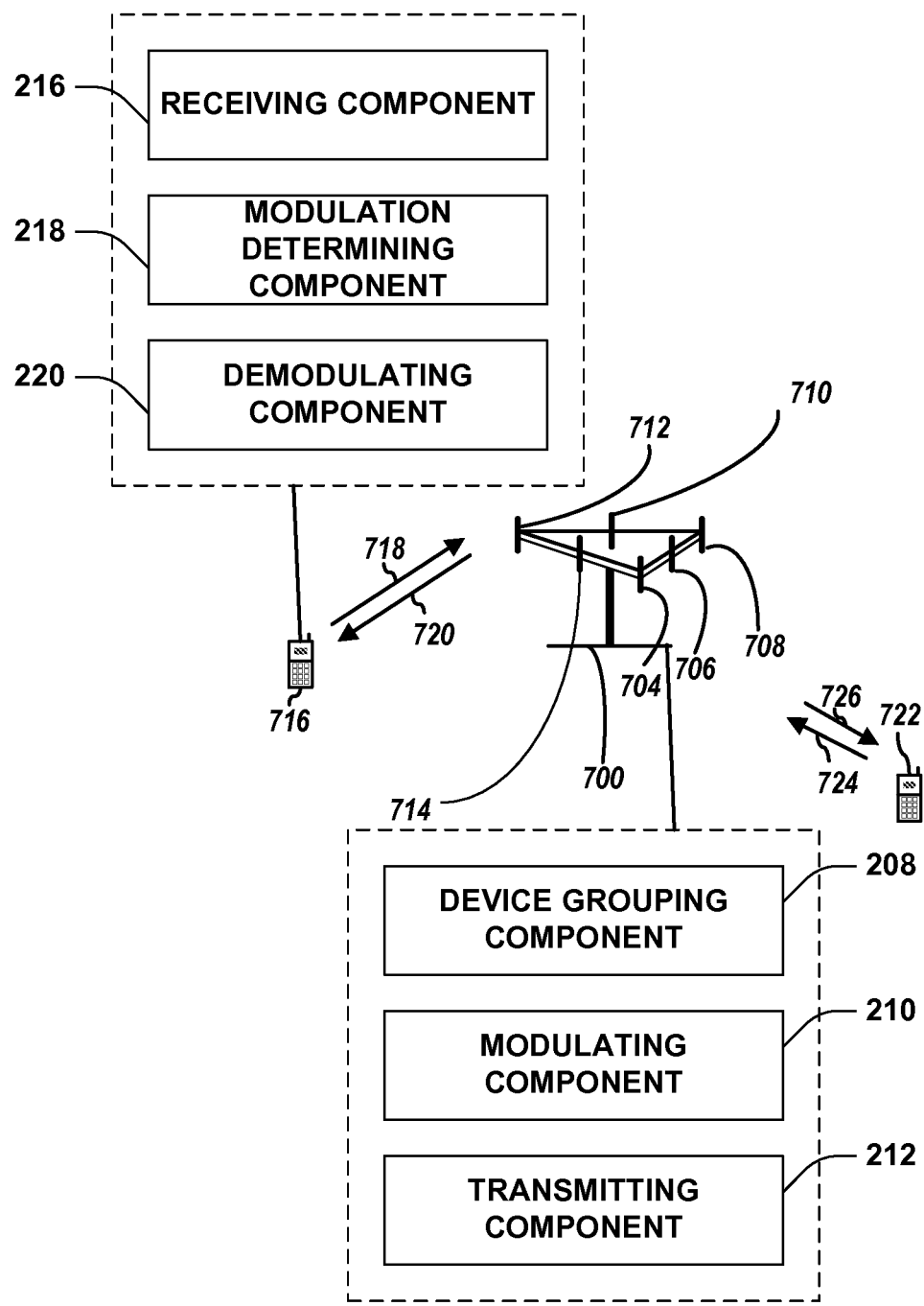
FIG. 7 illustrates a multiple access wireless communication system according to one embodiment.

Referring to FIG. 7, a multiple access wireless communication system according to one embodiment is illustrated. An access point 700 (AP) includes multiple antenna groups, one including 704 and 706, another including 708 and 710, and an additional including 712 and 714. In FIG. 7, only two antennas are shown for each antenna group, however, more or fewer antennas can be utilized for each antenna group. AP 700 can be an access point 102, and may thus include one or more components thereof, such as, but not limited to, device grouping component 208, modulating component 210, transmitting component 212, etc., for modulating control data for multiple devices as described herein (e.g., based on performing method 500 in FIG. 5, method 600 in FIG. 6, or otherwise). Access terminal 716 (AT) is in communication with antennas 712 and 714, where antennas 712 and 714 transmit information to access terminal 716 over forward link 720 and receive information from access terminal 716 over reverse link 718. Access terminal 722 is in communication with antennas 704 and 706, where antennas 704 and 706 transmit information to access terminal 722 over forward link 726 and receive information from access terminal 722 over reverse link 724. AT 716 and/or 722 can be a device 104 and/or 106, and may thus include one or more components thereof, such as, but not limited to, receiving component 216, modulation determining component 218, demodulating component 220, etc. for determining a layer and/or modulation scheme associated with control data received from one or more APs (e.g., based on performing method 400 in FIG. 4 or otherwise). In a FDD (frequency division duplex) system, communication links 718, 720, 724 and 726 can use different frequency for communication. For example, forward link 720 can use a different frequency then that used by reverse link 718.

Each group of antennas and/or the area in which they are designed to communicate is often referred to as a sector of the access point. In the embodiment, antenna groups each are designed to communicate to access terminals in a sector of the areas covered by access point 700.

In communication over forward links 720 and 726, the transmitting antennas of access point 700 utilize beamforming in order to improve the signal-to-noise ratio of forward links for the different access terminals 716 and 722. Also, an access point using beamforming to transmit to access terminals scattered randomly through its coverage causes less interference to access terminals in neighboring cells than an access point transmitting through a single antenna to all its access terminals.

Figure 8:
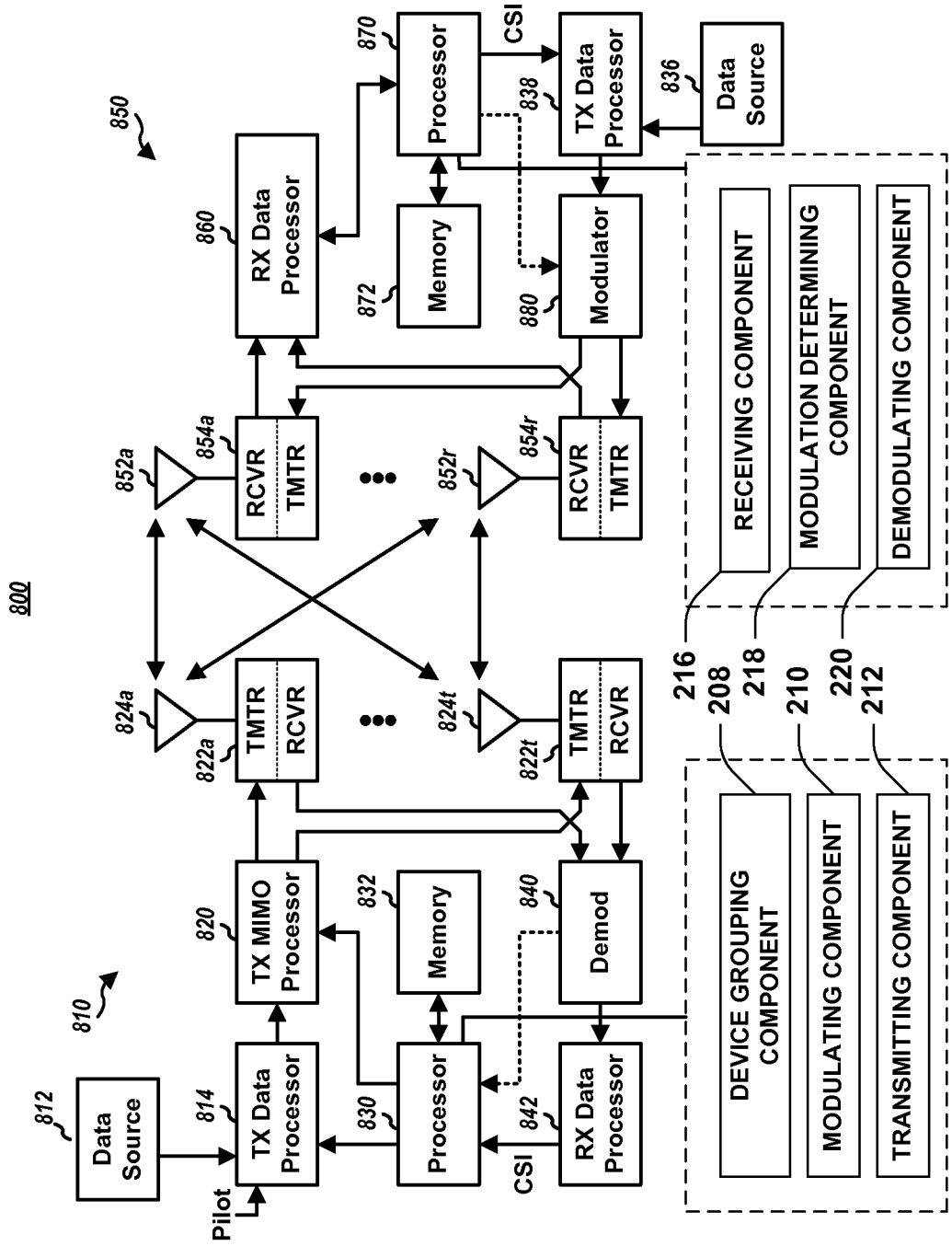
FIG. 8 illustrates a block diagram of a communication system.

FIG. 8 is a block diagram of an embodiment of a transmitter system 810 (also known as the access point) and a receiver system 850 (also known as access terminal) in a MIMO system 800. Transmitter system 810 can be an access point 102, and may thus include one or more components thereof, such as, but not limited to, device grouping component 208, modulating component 210, transmitting component 212, etc., for modulating control data for multiple devices as described herein (e.g., based on performing method 500 in FIG. 5, method 600 in FIG. 6, or otherwise). It is to be appreciated that one or more of the components can be executed by or otherwise coupled to processor 830 for executing functions thereof described herein. Moreover, for example, memory 832 can store instructions or parameters related to executing functions of the components described herein. In addition, for example, transmitting component 212 can include or otherwise be coupled to transmitter(s) 822, transmit MIMO processor 820, transmit data processor 814, etc. for transmitting control data using multiple layer modulation. Receiver system 850 can be a device 104 and/or 106, and may thus include one or more components thereof, such as, but not limited to, receiving component 216, modulation determining component 218, demodulating component 220, etc. for determining a layer and/or modulation scheme associated with control data received from one or more APs (e.g., based on performing method 400 in FIG. 4 or otherwise). It is to be appreciated that one or more of the components can be executed by or otherwise coupled to processor 870 for executing functions thereof described herein. Moreover, for example, memory 872 can store instructions or parameters related to executing functions of the components described herein. In addition, for example, receiving component 216 can include or otherwise be coupled to receiver(s) 854, receive data processor 860, etc. for receiving overlapped control data.

At the transmitter system 810, traffic data for a number of data streams is provided from a data source 812 to a transmit (TX) data processor 814. In addition, it is to be appreciated that transmitter system 810 and/or receiver system 850 can employ the systems (e.g., FIGS. 1 and 2), modulation schemes (e.g., FIG. 3), and/or methods (e.g., FIGS. 4-6) described herein to facilitate wireless communication therebetween. For example, components or functions of the systems and/or methods described herein can be part of a memory 832 and/or 872 or processors 830 and/or 870 described below, and/or can be executed by processors 830 and/or 870, to perform the disclosed functions.

In an embodiment, each data stream is transmitted over a respective transmit antenna. TX data processor 814 formats, codes, and interleaves the traffic data for each data stream based on a particular coding scheme selected for that data stream to provide coded data.

The coded data for each data stream can be multiplexed with pilot data using OFDM techniques. The pilot data is typically a known data pattern that is processed in a known manner and can be used at the receiver system to estimate the channel response. The multiplexed pilot and coded data for each data stream is then modulated (e.g., symbol mapped) based on a particular modulation scheme (e.g., BPSK, QPSK, M-PSK, or M-QAM) selected for that data stream to provide modulation symbols. The data rate, coding, and modulation for each data stream can be determined by instructions performed by processor 830.

The modulation symbols for all data streams are then provided to a TX MIMO processor 820, which can further process the modulation symbols (e.g., for OFDM). TX MIMO processor 820 then provides $N_T$ modulation symbol streams to $N_T$ transmitters (TMTR) 822a through 822t. In certain embodiments, TX MIMO processor 820 applies beamforming weights to the symbols of the data streams and to the antenna from which the symbol is being transmitted.

Each transmitter 822 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 822a through 822t are then transmitted from $N_T$ antennas 824a through 824t, respectively.

At receiver system 850, the transmitted modulated signals are received by $N_R$ antennas 852a through 852r and the received signal from each antenna 852 is provided to a respective receiver (RCVR) 854a through 854r. Each receiver 854 conditions (e.g., filters, amplifies, and downconverts) a respective received signal, digitizes the conditioned signal to provide samples, and further processes the samples to provide a corresponding "received" symbol stream.

An RX data processor 860 then receives and processes the $N_R$ received symbol streams from $N_R$ receivers 854 based on a particular receiver processing technique to provide $N_T$ "detected" symbol streams. The RX data processor 860 then demodulates, deinterleaves, and decodes each detected symbol stream to recover the traffic data for the data stream. The processing by RX data processor 860 is complementary to that performed by TX MIMO processor 820 and TX data processor 814 at transmitter system 810.

A processor 870 periodically determines which pre-coding matrix to use (discussed below). Processor 870 formulates a reverse link message including a matrix index portion and a rank value portion.

The reverse link message can include various types of information regarding the communication link and/or the received data stream. Channel state information (CSI) may be provided, which may include information regarding the communication link and/or the data stream. The reverse link message is then processed by a TX data processor 838, which also receives traffic data for a number of data streams from a data source 836, modulated by a modulator 880, conditioned by transmitters 854a through 854r, and transmitted back to transmitter system 810.

At transmitter system 810, the modulated signals from receiver system 850 are received by antennas 824, conditioned by receivers 822, demodulated by a demodulator 840, and processed by a RX data processor 842 to extract the reserve link message transmitted by the receiver system 850. Channel state information (CSI) may be provided, which may include information regarding the communication link and/or the data stream. Processor 830 determines which pre-coding matrix to use for determining the beamforming weights then processes the extracted message.

Processors 830 and 870 can direct (e.g., control, coordinate, manage, etc.) operation at transmitter system 810 and receiver system 850, respectively. Respective processors 830 and 870 can be associated with memory 832 and 872 that store program codes and data. Processors 830 and 870 can also perform computations to derive frequency and impulse response estimates for the uplink and downlink, respectively.

The communication networks that may accommodate some of the various disclosed embodiments may include logical channels that are classified into Control Channels and Traffic Channels. Logical control channels may include a broadcast control channel (BCCH), which is the downlink channel for broadcasting system control information, a paging control channel (PCCH), which is the downlink channel that transfers paging information, a multicast control channel (MCCH), which is a point-to-multipoint downlink channel used for transmitting multimedia broadcast and multicast service (MBMS) scheduling and control information for one or several multicast traffic channels (MTCHs). Generally, after establishing radio resource control (RRC) connection, MCCH is only used by the user equipments that receive MBMS. Dedicated control channel (DCCH) is another logical control channel that is a point-to-point bi-directional channel transmitting dedicated control information, such as user-specific control information used by the user equipment having an RRC connection. Common control channel (CCCH) is also a logical control channel that may be used for random access information. Logical traffic channels may include a dedicated traffic channel (DTCH), which is a point-to-point bi-directional channel dedicated to one user equipment for the transfer of user information. Also, a multicast traffic channel (MTCH) may be used for point-to-multipoint downlink transmission of traffic data.

The communication networks that accommodate some of the various embodiments may additionally include logical transport channels that are classified into downlink (DL) and uplink (UL). The DL transport channels may include a broadcast channel (BCH), a downlink shared data channel (DL-SDCH), a multicast channel (MCH) and a Paging Channel (PCH). The UL transport channels may include a random access channel (RACH), a request channel (REQCH), an uplink shared data channel (UL-SDCH) and a plurality of physical channels. The physical channels may also include a set of downlink and uplink channels.

In some disclosed embodiments, the downlink physical channels may include at least one of a common pilot channel (CPICH), a synchronization channel (SCH), a common control channel (CCCH), a shared downlink control channel (SDCCH), a multicast control channel (MCCH), a shared uplink assignment channel (SUACH), an acknowledgement channel (ACKCH), a downlink physical shared data channel (DL-PSDCH), an uplink power control channel (UPCCH), a paging indicator channel (PICH), a load indicator channel (LICH), a physical broadcast channel (PBCH), a physical control format indicator channel (PCFICH), a physical downlink control channel (PDCCH), a physical hybrid ARQ indicator channel (PHICH), a physical downlink shared channel (PDSCH) and a physical multicast channel (PMCH). The uplink physical channels may include at least one of a physical random access channel (PRACH), a channel quality indicator channel (CQICH), an acknowledgement channel (ACKCH), an antenna subset indicator channel (ASICH), a shared request channel (SREQCH), an uplink physical shared data channel (UL-PSDCH), a broadband pilot channel (BPICH), a physical uplink control channel (PUCCH) and a physical uplink shared channel (PUSCH).

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may include one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software/firmware, or combinations thereof. If implemented in software/firmware, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can include RAM, ROM, EEPROM, flash memory, phase change memory (PCM), CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for demodulating control data in wireless communications, comprising:
    receiving, at a device, a signal from an access point comprising a plurality of orthogonal frequency division multiplexing (OFDM) symbols in a search space for a control channel, wherein each symbol includes at least one control data resource corresponding to the control channel, wherein the at least one control data resource is associated with a plurality of devices with each device of the plurality of devices having a different combination of an assigned modulation scheme and an assigned layer within the at least one control data resource of the symbol, wherein the combination of the assigned modulation scheme and the assigned layer is assigned to each device of the plurality of devices based on feedback from each device;
    determining whether the at least one control data resource includes overlapping control data for the device and at least one other device of the plurality of devices;
    determining one of a plurality of modulation schemes utilized to modulate the at least one control data resource based at least in part on the determination;
    determining an enhancement layer associated with modulation of control data for the device;
    determining the search space based at least in part on the enhancement layer; and
    demodulating the signal according to the one of the plurality of modulation schemes and the enhancement layer to obtain control data in the at least one control data resource,
    wherein the demodulating the signal further comprises using a higher modulation scheme of the plurality of modulation schemes based at least in part on a determination that the at least one control data resource includes overlapping control data.

2. The method of claim 1, wherein determining whether the at least one control data resource includes overlapping control data is based at least in part on receiving an indication from the access point specifying whether the at least one control data resource includes overlapping control data.

3. The method of claim 1, wherein determining whether the at least one control data resource includes overlapping control data is based at least in part on performing multiple demodulations of the signal using at least two of the plurality of modulation schemes, applying a cyclic redundancy check (CRC) to each of the multiple demodulations, and determining which demodulation yields the at least one control data resource based on the respective CRC.

4. The method of claim 1, wherein demodulating the signal comprises obtaining a last two bits of the at least one control data resource corresponding to the enhancement layer.

5. The method of claim 4, wherein determining the enhancement layer is based at least in part on determining whether the at least one control data resource includes overlapping control data.

6. The method of claim 4, wherein determining the enhancement layer is based at least in part on determining that a channel feedback reported to the access point achieves a threshold.

7. The method of claim 1, further comprising determining one or more resources for transmitting control data to the access point based at least in part on the enhancement layer.

8. An apparatus for demodulating control data in wireless communications, comprising:

a processor; and a memory coupled to the processor, wherein the memory includes instructions executable by the processor to:

receive, at a device, a signal from an access point comprising a plurality of orthogonal frequency division multiplexing (OFDM) symbols in a search space for a control channel, wherein each symbol includes at least one control data resource corresponding to the control channel, wherein the at least one control data resource is associated with a plurality of devices with each device of the plurality of devices having a different combination of an assigned modulation scheme and an assigned layer within the at least one control data resource of the symbol, wherein the combination of the assigned modulation scheme and the assigned layer is assigned to each device of the plurality of devices based on feedback from each device;

determine whether the at least one control data resource includes overlapping control data for the device and at least one other device of the plurality of devices;

determine one of a plurality of modulation schemes utilized to modulate the at least one control data resource based at least in part on the determination;

determine an enhancement layer associated with modulation of control data for the device;

determine the search space based at least in part on the enhancement layer; and demodulate the signal according to the one of the plurality of modulation schemes and the enhancement layer to obtain control data in the at least one control data resource, wherein the demodulating the signal further comprises using a higher modulation scheme of the plurality of modulation schemes based at least in part on a determination that the at least one control data resource includes overlapping control data.

9. The apparatus of claim 8, wherein determining whether the at least one control data resource includes overlapping control data is based at least in part on receiving an indication from the access point specifying whether the at least one control data resource includes overlapping control data.

10. The apparatus of claim 8, wherein the instructions are further executable by the processor to determine the enhancement layer based at least in part on determining whether the at least one control data resource includes overlapping control data, which is based at least in part on performing multiple demodulations of the signal using at least two of the plurality of modulation schemes, applying a cyclic redundancy check (CRC) to each of the multiple demodulations, and determining which demodulation yields the at least one control data resource based on the respective CRC.

11. The apparatus of claim 8, wherein demodulating the signal comprises obtaining a last two bits of the at least one control data resource corresponding to the enhancement layer.

12. The apparatus of claim 8, wherein the instructions are further executable by the processor to determine one or more resources for transmitting control data to the access point based at least in part on the enhancement layer.

13. A method for modulating control data in wireless communications, comprising:

determining a plurality of devices for assigning a control data resource for communicating control data, wherein the plurality of devices includes a first device and a second device and the plurality of devices are assigned at least a portion of similar control data resources, with the first device and the second device each having a different combination of an assigned modulation scheme and an assigned layer within the portion of similar control data resource of an orthogonal frequency division multiplexing (OFDM) symbol and the combination of the assigned modulation scheme and the assigned layer is assigned to each device based on feedback from the first device and the second device;

modulating first control data for the first device in an enhancement layer of the control data resource using a higher modulation scheme of a plurality of modulation schemes based at least in part on the control data resource including second control data for the second device that overlaps on the control data resource with the first control data for the first device; and transmitting at least the first control data as modulated over the control data resource in a search space for a control channel corresponding to the control data resource, wherein the search space is determined based at least in part on the enhancement layer.

14. The method of claim 13, wherein modulating the first control data for the first device in the enhancement layer of the control data resource is regardless of whether the control data resource includes the second control data for the second device.

15. The method of claim 13, further comprising:

modulating the second control data for the second device in a base layer of the control data resource;

performing a multiple layer modulation of the control data resource by superpositioning the base layer and the enhancement layer; and transmitting the second control data with the first control data in the multiple layer modulation of the control data resource.

16. The method of claim 15, wherein modulating the first control data is based on 16-quadrature amplitude modulation, and wherein modulating the second control data is based on quadrature phase shift keying.

17. The method of claim 15, further comprising determining to group the first device and the second device for communicating the first control data and the second control data in the control data resource based at least in part on reported channel feedback from the first device and the second device.

18. The method of claim 13, further comprising:

modulating third control data for the first device in a base layer of the control data resource;

performing a multiple layer modulation of the control data resource by superpositioning the base layer and the enhancement layer; and transmitting the third control data with the first control data in the multiple layer modulation of the control data resource.

19. The method of claim 13, further comprising transmitting an indication of whether the control data resource includes overlapped control data for multiple devices to the first device.

20. The method of claim 13, further comprising receiving uplink control data from the first device in resources determined based at least in part on modulating the first control data for the first device in the enhancement layer.

21. An apparatus for modulating control data in wireless communications, comprising:

a processor; and a memory coupled to the processor, wherein the memory includes instructions executable by the processor to:

determine a plurality of devices for assigning a control data resource for communicating control data, wherein the plurality of devices includes a first device and a second device and the plurality of devices are assigned at least a portion of similar control data resource, with the first device and the second device each having a different combination of an assigned modulation scheme and an assigned layer within the portion of similar control data resource of an orthogonal frequency division multiplexing (OFDM) symbol and the combination of the assigned modulation scheme and the assigned layer is assigned to each device based on feedback from the first device and second device;

modulate first control data for a first device in an enhancement layer of a control data resource using a higher modulation scheme of a plurality of modulation schemes based at least in part on the control data resource including second control data for a second device that overlaps on the control data resource with the first control data for the first device; and transmit at least the first control data as modulated over the control data resource in a search space for a control channel corresponding to the control data resource, wherein the search space is determined based at least in part on the enhancement layer.

22. The apparatus of claim 21, wherein the instructions are further executable by the processor to modulate the second control data for the second device in a base layer of the control data resource, and perform a multiple layer modulation of the control data resource by superpositioning the base layer and the enhancement layer, and wherein the transmitting comprises transmitting the second control data with the first control data in the multiple layer modulation of the control data resource.

23. The apparatus of claim 22, wherein the instructions are further executable by the processor to:
determine to group the first device and the second device for communicating the first control data and the second control data in the control data resource based at least in part on reported channel feedback from the first device and the second device.

24. The apparatus of claim 21, wherein the instructions are further executable by the processor to:
receive uplink control data from the first device in resources determined based at least in part on modulating the first control data for the first device in the enhancement layer.

25. The method of claim 1, wherein the device is paired with the at least one other device when the feedback from the device is above a threshold and the feedback from the at least one other device is below the threshold.

* * * * *